United States Patent
Logue (10) Patent No.: US 8,270,335 B1
(45) Date of Patent: Sep. 18, 2012

(54) ARBITRATION FOR TIME DIVISION MULTIPLE ACCESS USING DELTA SIGMA MODULATION

(75) Inventor: John D. Logue, Placerville, CA (US)

(73) Assignee: Xilinx, Inc., San Jose, CA (US)

(*) Notice: Subject to any disclaimer, the term of this patent is extended or adjusted under 35 U.S.C. 154(b) by 1239 days.

(21) Appl. No.: 12/039,707

(22) Filed: Feb. 28, 2008

(51) Int. Cl.
  H04W 4/00 (2009.01)
  H04B 7/212 (2006.01)
  H03M 3/00 (2006.01)
  H04K 1/10 (2006.01)
  H04L 27/28 (2006.01)

(52) U.S. Cl. ............. 370/314; 370/321; 370/395.4; 375/260; 375/376; 341/143; 710/45; 710/117; 710/124

(58) Field of Classification Search .......... 370/232, 370/294, 314, 321, 326, 330, 336, 345, 395.4–395.43, 370/473, 478, 487, 490, 506, 537, 538, 540; 455/260; 341/123–126, 141, 143; 375/242, 375/247, 253, 254, 260, 276, 278, 377; 710/22–28, 710/40–45, 113–124, 309
See application file for complete search history.

(56) References Cited

U.S. PATENT DOCUMENTS

| | | | |
|---|---|---|---|
| 5,768,316 A * | 6/1998 | Sogo | 375/260 |
| 5,949,360 A * | 9/1999 | Maejima | 341/141 |
| 6,920,182 B2 * | 7/2005 | Bolton, Jr. | 375/247 |
| 7,522,079 B1 * | 4/2009 | Wu | 341/143 |
| 7,564,391 B2 * | 7/2009 | Das | 341/144 |
| 7,734,856 B2 * | 6/2010 | Reinig et al. | 710/243 |
| 7,742,785 B2 * | 6/2010 | Harms | 455/552.1 |
| 7,916,054 B2 * | 3/2011 | Baker | 341/143 |
| 2002/0121994 A1 * | 9/2002 | Bolton, Jr. | 341/143 |
| 2007/0233923 A1 * | 10/2007 | Lee | 710/116 |
| 2009/0119433 A1 * | 5/2009 | Sama | 710/117 |

OTHER PUBLICATIONS

Xilinx Application Note, XAPP154, Sep. 23, 1999, Version 1.1, John Logue, entitled "Virtex Synthesizable Delta-Sigma DAC", pp. 1-8, Xilinx, Inc. 2100 Logic Drive, CA.

* cited by examiner

*Primary Examiner* — Habte Mered (74) *Attorney, Agent, or Firm* — W. Eric Webostad; Gerald Chan (57) ABSTRACT

Method and device for arbitration for time division multiple access using delta-sigma modulation for an integrated circuit are described. A method for arbitrating access to a shared resource among multiple devices includes obtaining a first arbitration factor. The first arbitration factor is first delta-sigma modulated to produce a first slot signal. The first slot signal is for Time Division Multiple Access-arbitrated access to the shared resource.

18 Claims, 8 Drawing Sheets

ARBITRATION FOR TIME DIVISION MULTIPLE ACCESS USING DELTA SIGMA MODULATION

FIELD OF THE INVENTION

The invention relates to integrated circuit devices (ICs). More particularly, the invention relates to arbitration for Time Division Multiple Access using delta-sigma modulation for an IC.

BACKGROUND OF THE INVENTION

Time Division Multiple Access ("TDMA") allows a resource to be shared among multiple master devices. There are many applications for TDMA, including circuits and communications, both wired and wireless for network communications, mobile and fixed telephony communications, and other known types of communication systems. In communications, TDMA is conventionally used to allow multiple users to share a same channel by dividing a signal into different time slots. Thus, for example, a single carrier frequency may be used by multiple users where each user is assigned slots of time. Slots may be assigned dynamically in TDMA based on demand. Accordingly, arbitrating among multiple users for granting channel access may be facilitated by enhancing granularity in such allocation.

SUMMARY OF THE INVENTION

Accordingly, arbitrating among multiple users for granting channel access may be facilitated by enhancing granularity in such allocation.

One or more aspects generally relate to integrated circuit devices (ICs) and, more particularly, to arbitration for time division multiple access using delta-sigma modulation for an IC.

An aspect relates generally to a method for arbitrating access to a shared resource among multiple devices. A first arbitration factor is obtained. The first arbitration factor is first delta-sigma modulated to produce a first slot signal. The first slot signal is for Time Division Multiple Access-arbitrated access to the shared resource.

Another aspect relates generally to a Time Division Multiple Access arbiter. A first delta-sigma modulator is for receiving a first modulation factor and configured to produce a first slot allocation responsive to the first modulation factor. A second delta-sigma modulator for receiving a second modulation factor and configured to produce a second slot allocation responsive to the second modulation factor and the first slot allocation.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
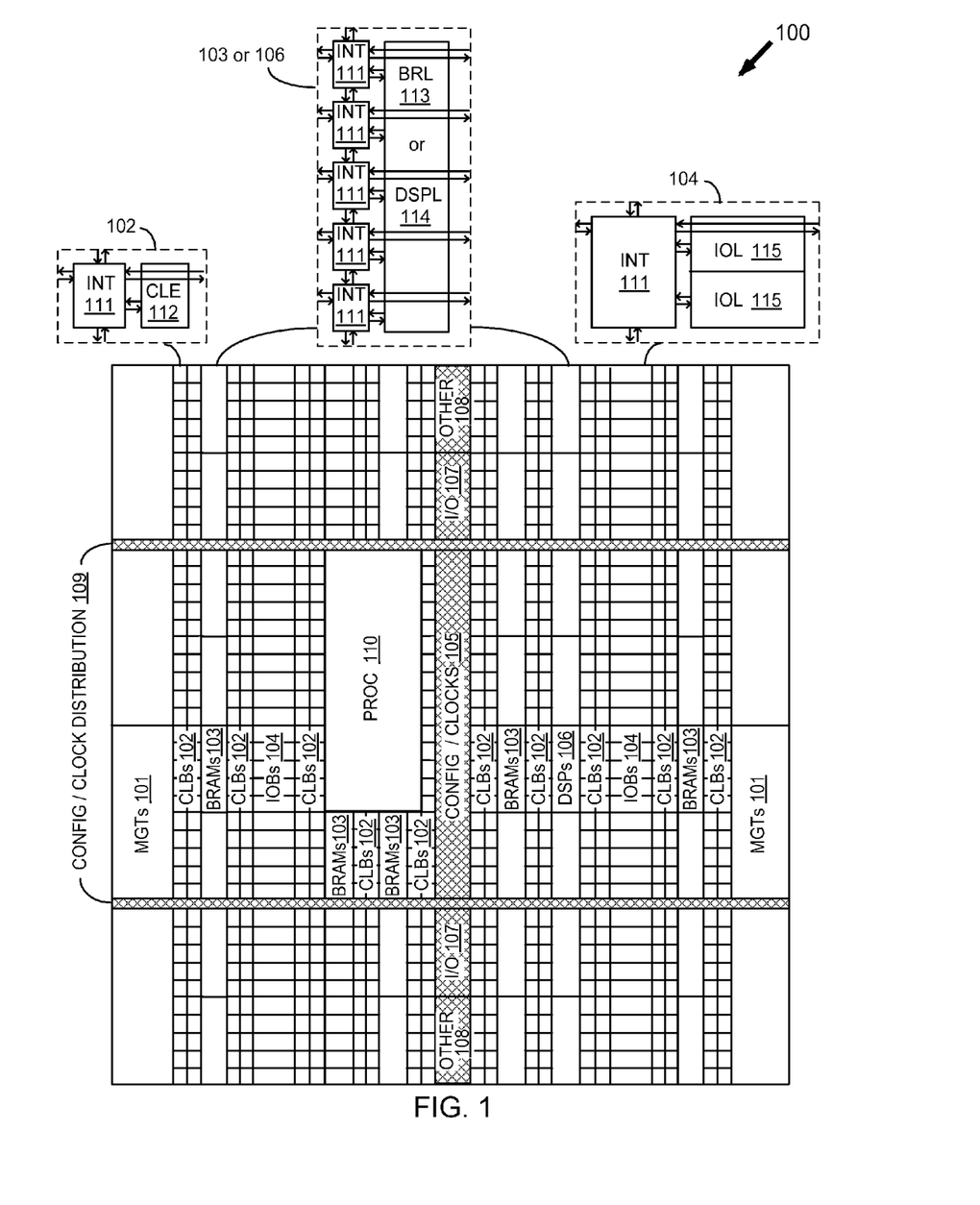
FIG. 1 is a simplified block diagram depicting an exemplary embodiment of a columnar Field Programmable Gate Array ("FPGA") architecture in which one or more aspects of the invention may be implemented.

As is known, advanced Field Programmable Gate Arrays ("FPGAs") can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. As used herein, the terms "include" and "including" mean to include without limitation.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
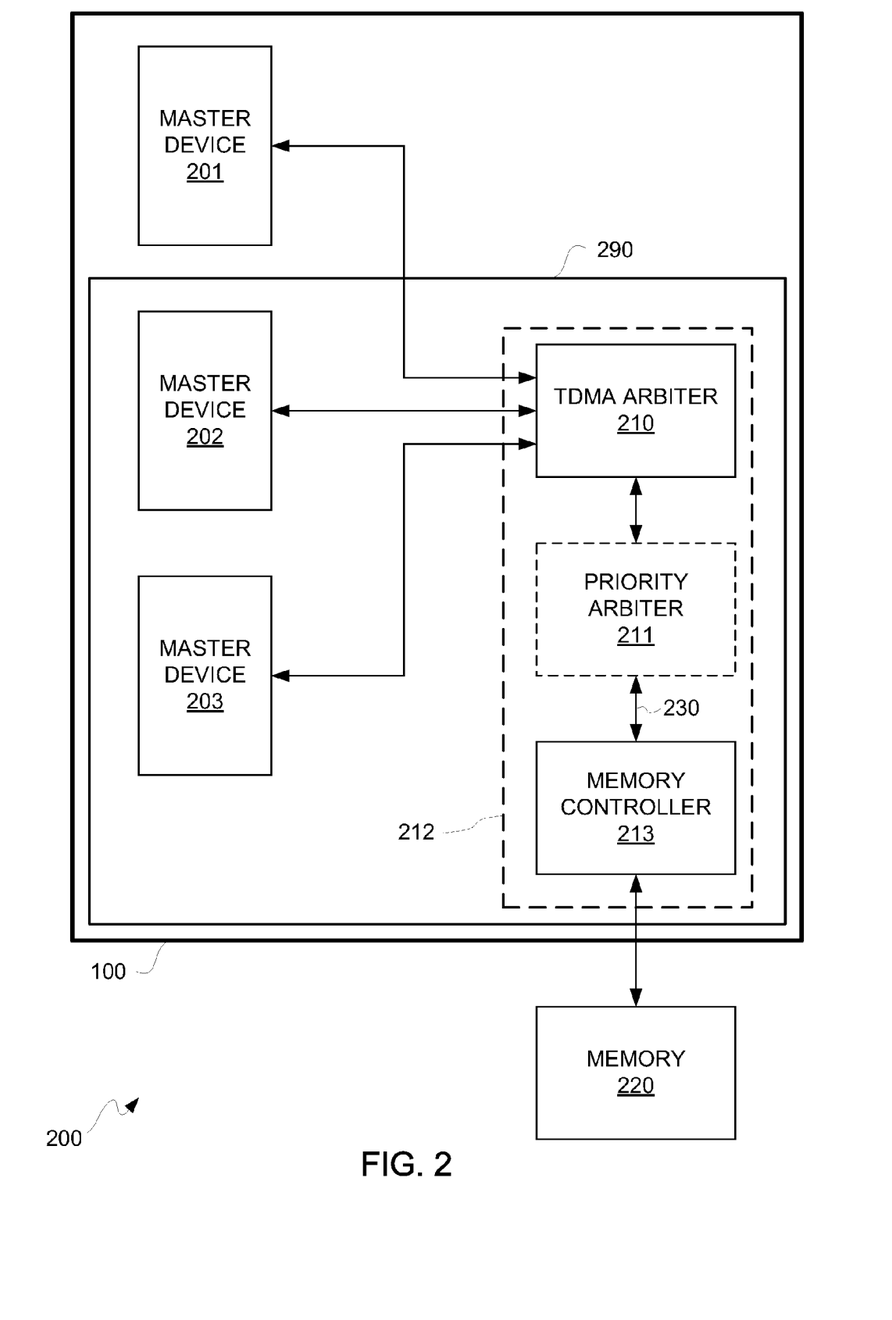
FIG. 2 is block diagram depicting an exemplary embodiment of an FPGA system.

FIG. 2 is block diagram depicting an exemplary embodiment of an FPGA system 200. FPGA system 200 includes memory 220 coupled to FPGA 100. Even though an FPGA system is described, it shall be appreciated from the following description that TDMA arbitration as described herein may be used in any integrated circuit where multiple resources share channel access. Furthermore, even though FPGA system 200 is described in terms of sharing channel access to memory 220, it shall be appreciated from the following description that TDMA arbitration as described herein may be used in communication systems.

FPGA 100 may include multiple master devices, such as master devices 201 through 203. An example of master device 201 may be microprocessor of processor block 110 of FIG. 1. An example of master device 202 may be a direct memory access ("DMA") device, such as an Ethernet Media access controller, a DMA peripheral component interconnect ("PCI"), or some other DMA device. Such master devices may be "hard" master devices or, in other words, embedded hardwired circuits, such as a "hard" microprocessor, EMAC, or PCI device. Moreover, one or more master devices may be instantiated in FPGA fabric 290 of FPGA 100 as "soft" master devices. By "FPGA fabric," it is meant programmable logic resources of FPGA 100. Furthermore, a combination of hard and soft master devices may be used. For purposes of clarity by way of example and not limitation, it shall be assumed that master device 201 is a hard master device and master devices 202 and 203 are instantiated in FPGA fabric 290, and thus are soft master devices. Master devices 201 through 203 may be coupled to a TDMA arbiter 210. Moreover, an optional priority arbiter 211 may be coupled to TDMA arbiter 210. Furthermore, memory controller 213 may be coupled to TDMA arbiter 210 or to priority arbiter 211 (if used). Memory controller 213 may be coupled for bidirectional communication with memory 220. Optionally, TDMA arbiter 210 and priority arbiter 211 may be part of memory controller 213 as illustratively indicated by dashed box 212.

In this example, busy signaling allows memory controller 213 to inform arbiters 210 and 211 as to whether memory controller 213 is too busy to receive another transaction, as described below in additional detail. In the following description, it shall be understood that one or more master devices 201 through 203 initiates a request for a transaction. These requests may be passed through TDMA arbiter 210 to priority arbiter 211 for being synchronous with associated slot signals.

TDMA arbiter 210 provides slot signals for request signals to priority arbiter 211. Priority arbiter 211 provides service signals to memory controller 213. Service signals are respectively associated with master devices 201 through 203. These transactions, whether reads from memory 220 or writes to memory 220, are serviced by memory controller 213 responsive to time slots associated with service signals provided from priority arbiter 211. In an embodiment where priority arbiter 211 is omitted, time slot signals may be passed directly from TDMA arbiter 210 with associated request signals to memory controller 213. However, for purposes of clarity by way of example and not limitation, it shall be assumed that priority arbiter 211 is used, even though such priority arbiter 211 is optional.

In a reverse transaction direction, such as responsive to providing data back to a requesting master device for a read operation, service signals provided from arbiter 211 or slot signals provided from arbiter 210 may be used for allocating bandwidth in a return direction. However, for purposes of clarity and not limitation, a forward transaction direction, namely starting from a transaction originating direction, is described for arbitration to bandwidth access of a channel, arbitration in the reverse transaction direction shall be understood from the following description.

In the embodiment illustratively shown in FIG. 2, there are three ports associated with providing requests to TDMA arbiter 210. A number of ports, N, may be two or more. For a three-port TDMA arbiter 210, there are two delta-sigma modulators ("DSMs"). More generally, for N ports, there are (N−1) DSMs in TDMA arbiter 210.

DSMs of TDMA arbiter 210 are ordered. Thus, a highest order DSM shall take precedence over all DSM(s) (if any) of lower order. In other words, for each clock cycle in which a highest order DSM outputs a logic 1, all lower level DSM(s) are "frozen" at their current value. For purposes of clarity by way of example and not limitation, a three-port TDMA arbiter 210 is described with a $2^7$-bit resolution. In other words, two 7-bit DSMs are described, each providing a $1/128$th granularity for mapping 100 percent of allocable bandwidth. In other words, each DSM is capable of representing as little as $1/128$th of the available bandwidth, where a first DSM is capable of representing as little as $1/128$th of the total allocable bandwidth and any DSM thereafter is capable of representing $1/128$th of the remaining bandwidth available to it.

Figure 3:
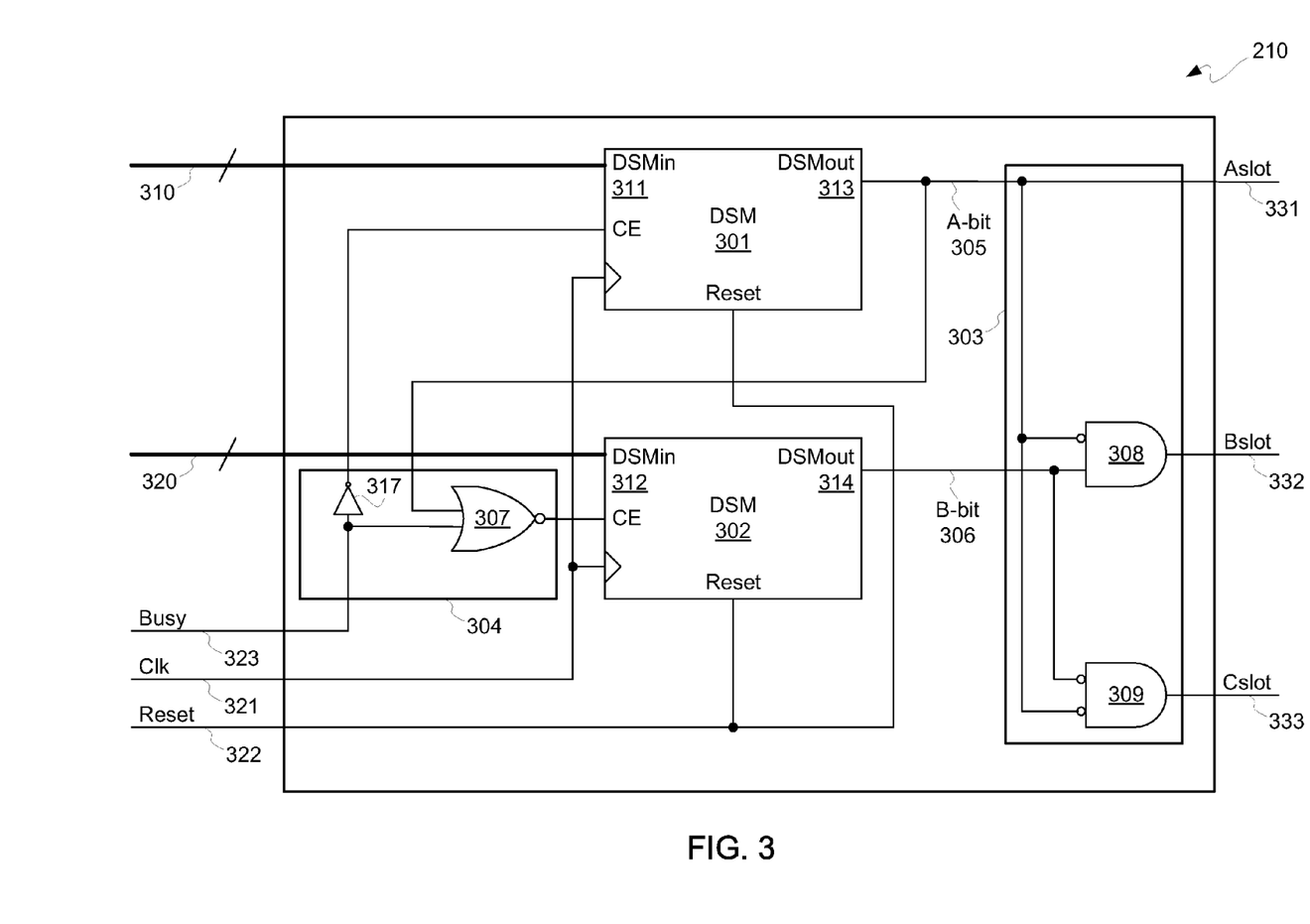
FIG. 3 is a block/schematic diagram depicting an exemplary embodiment of a three slot assignment Time Division Multiple Access ("TDMA") arbiter of the FPGA system of FIG. 2.

FIG. 3 is a block/schematic diagram depicting an exemplary embodiment of TDMA arbiter 210. TDMA arbiter 210 includes DSM 301 and DSM 302 along with slot select circuit 303 and busy control logic 304. An A-factor 310 is input to DSM input port 311 of DSM 301, and a B-factor 320 is input to DSM input port 312 of DSM 302. Continuing the above example of two 7-bit DSMs, A-factor 310 is a 7-bit value indicating a fraction of the total allocable bandwidth of a channel. B-factor 320 is likewise is a 7-bit value. However, B-factor 320 represents a fraction of the remaining allocable bandwidth after allocation of the higher order DSM 301.

In this embodiment, A-factor and B-factor buses 310 and 320, respectively, are used to specify bandwidth assignments for three ports, namely slot signals 331 through 333. Continuing the example of a 7-bit value for a granularity or resolution of $\frac{1}{2}^7$, A-factor 310 is divided by 128 and represents the fraction of total bandwidth assigned to port A associated with A slot signal 331. B-factor 320 is divided by 128 and represents the fraction of the remaining bandwidth assigned to port B associated with B slot signal 332. Any remaining allocable bandwidth after assignment of bandwidth to ports A and B, is assigned or defaulted to port C as associated with C slot signal 333.

For example, if A-factor 310 represents the value 32, then one quarter ($^{32}/_{128}$) or 25% of the total bandwidth allocable is assigned to port A. If B-factor 320 represents the value 64, then one half of the remaining bandwidth, namely after assignment of a portion of the total allocable bandwidth to port A, is assigned to port B. In this example, port B has ($\frac{1}{2}$) ($\frac{3}{4}$)=$\frac{3}{8}$, or 37.5% of the total bandwidth. In other words, B-factor is determined by $^{64}/_{128}$ multiplied by the fraction of the bandwidth remaining, namely $\frac{3}{4}$ in this example. Continuing the example, if 62.5% of the total bandwidth allocable is allocated to ports A and B, namely 25% to port A and 37.5% to port B, then the remainder is 37.5% of the total bandwidth, which in this example is allocated to port C. There may be (N−1) DSMs, because the lowest order slot allocation follows from all prior higher order slot allocation(s).

DSMs 301 and 302 operate in response to clock signal 321 which is provided to respective clock ports thereof. DSMs 301 and 302, which operate similarly to accumulators, 9-bit accumulators in this example, may be reset responsive to reset signal 322. If memory controller 213 of FIG. 2 has a buffer, such as a first-in/first-out buffer ("FIFO"), for buffering incoming transactions, and if such buffer is full or is about to be full, memory controller 213 may assert a busy signal 323. Busy signal 323 may be provided to busy control logic 304. Busy control logic 304 is configured such that if a resource, such as memory controller 213, goes busy, TDMA arbiter 310 is "frozen" at a current output until the busy condition is removed by the resource, namely memory controller 213.

Busy control logic 304, coupled to receive busy signal 323, may further be coupled to receive an output from each DSM other than a lowest order DSM. In this exemplary embodiment, control circuit 304 includes inverter 317 and NOR gate 307. Busy signal 323 is passed to an input of inverter 317 for inversion, and the output of inverter 317 is provided to a clock enable ("CE") port of DSM 301. Busy signal 323 is further provided to an input port of NOR gate 307. An A-bit signal ("A-bit") 305 output from DSM output port 313 of DSM 301 is provided to another input port of NOR gate 307. Output of NOR gate 307 is provided to a clock enable port of DSM 302. Busy signal 323 is an active high signal, namely busy signal 323 goes logic high when the resource issuing such busy signal is busy.

Responsive to A-factor 310, DSM 301 outputs a string of single bits. Thus, DSM 301 via DSM output port 313 outputs single bits, each of which is either a logic 0 or a logic 1 as a single bit string output, namely A-bit 305. Output from DSM 301 is provided on each clock cycle of clock signal 321. The duty cycle of A-bit 305, also referred to as A slot signal 331, is responsive to the value of A-factor 310. DSM 301 is the highest order DSM. Thus, if for example A-factor 310 represented a value of 64, DSM 301 via DSM output port 313 may provide 64 logic 1s interleaved with 64 logic 0s, namely alternating logic 1s and 0s, in 128 clock cycles of clock signal 321, namely a 50-50 duty cycle, assuming no interruption due to assertion of busy signal 323.

Duty cycle of A slot signal 331 can be affected by assertion of busy signal 323, as DSM 301 may not run continuously for 128 clock cycles due to such assertion of busy signal 323. Assuming busy signal 323 is not asserted, then output of NOR gate 307 causes DSM 302 to be running during logic 0s output from DSM 301 and not running otherwise. DSM 302 is not continuously operated, namely DSM 302 has its clock disabled for logic 1s output from DSM 301. Thus, a reduction factor in allocable bandwidth may be built in by feeding back output of all higher order DSMs of each DSM for asserting and deasserting a clock activation (e.g., CE) signal provided to such DSM. Thus, assuming a busy signal is not asserted, all but a highest order DSM may be activated and deactivated responsive to assertion and deassertion, respectively, of such clock activation signal.

DSMs as described herein may be configured to produce output pulses that are distributed as evenly as mathematically possible. Logic high bits output from a DSM, such as DSM 301, indicate that a port, such as port A, may be granted bandwidth or channel access to a channel. A-bit 305 passes directly through slot select circuit 303 to provide A slot signal 331.

However, B slot signal 332 does not directly pass through select circuit 303, but is gated by AND gate 308. Thus, for example, if B-factor 320 represented the value 64 and A-factor 310 represented the value 64, then output of DSM 302 would represent 25% of the total allocable bandwidth available. B-bit signal ("B-bit") 306 output from DSM output port 314 of DSM 302 is input to AND gate 308 along with an inverted A-bit 305 to provide B slot signal 332 having a 25 to 75 ("25-75") duty cycle.

There may be instances where both A-bit 305 and B-bit 306 are logic 1 on a same clock cycle. Because DSM 301 has higher priority, slot select circuit 303 may be configured to allocate such conflict to A slot signal 331 as generally indicated by coupling A-bit 305 to an inverted port of AND gate 308 of select circuit 303, again where another input port of AND gate 308 is coupled to receive B-bit 306. Again, output of AND gate 308 is used to source B slot signal 332. Again, it should be understood that for logic 1s of A-bit 305, DSM 302 is not active.

In addition to AND gate 308, slot select circuit 303 may include AND gate 309. Both input ports of AND gate 309 may be inverted and respectively coupled for receiving A-bit 305 and B-bit 306. Thus, if both A-bit 305 and B-bit 306 are logic 0, output of AND gate 309 is logic high. C slot signal 333 is sourced from the output of AND gate 309. Thus, continuing the above example, C slot signal 333 may be have the same duty cycle as B slot signal 332 in the above example.

Accordingly, it should be appreciated that output of TDMA arbiter 210 has only one of slot signals 331 through 333 active at a time. Furthermore, it should be appreciated that a slot signal for a port with more assigned bandwidth will be active more often than a port with less assigned bandwidth. Thus, output from TDMA arbiter 210 is a round robin output of slot signals 331 through 333 that limits each access to an allocated percentage of total allocable bandwidth. However, as described below in additional detail, channel access may be conditioned upon the resource associated with such port having an active request.

Returning to FIG. 2, it should be appreciated that transactions may be placed in a buffer (not shown for purposes of clarity) of memory controller 213 via channel 230. Access to channel 230 may be arbitrated directly using slot signals 331 through 333. In other words, slot signals 331 through 333 of FIG. 3, which may respectively be associated with master devices 201 through 203, may be used for arbitrated access to channel 230 for placing transactions in a transaction buffer or queue of memory controller 213. Additionally, it should be appreciated that channel utilization of channel 230 may be enhanced by determining whether a master device having a slot assigned thereto also has an active request. In other words, if a master device had a slot assigned to it but had no active request, the master device having the slot assigned may be passed over to avoid preventing one or more other master devices having active requests from using the channel. Accordingly, priority arbiter 211 may optionally be included to enhance channel utilization of channel 230.

Figure 4:
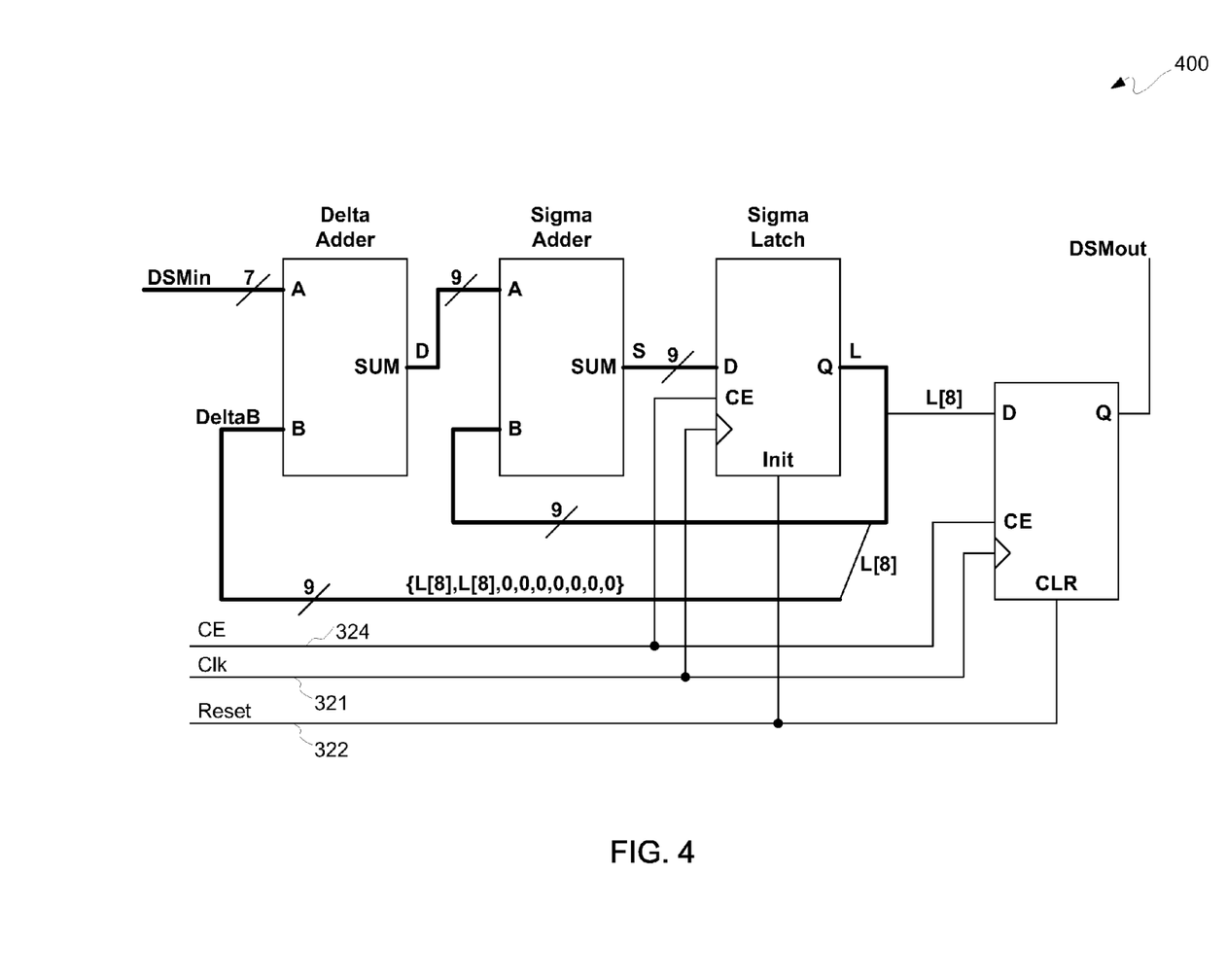
FIG. 4 is a block/circuit diagram depicting an exemplary embodiment of a delta-sigma modulator ("DSM") of the TDMA arbiter of FIG. 3.

FIG. 4 is a block/circuit diagram depicting an exemplary embodiment of a DSM 400. DSM 400 may be respectively used as DSMs 301 and 302 of TDMA arbiter 210 of FIG. 3. DSM 400 follows from a DSM that is described in additional detail in "Virtex™ Synthesizable Delta-Sigma DAC" by the inventor hereof, published by Xilinx, Inc. as Application Note XAPP154, Sep. 23, 1999 (Version 1.1). Thus, DSM 400 is not described in unnecessary detail herein.

It should be appreciated that a user may assign values for A-factor 310 and B-factor 320 of FIG. 3. However, A-factor 310 and B-factor 320 need not have statically assigned values but may be dynamically assigned on demand based on usage. Thus, values for A-factor 310 and B-factor 320 may be assigned by a state machine or a script running in a microprocessor, such as processor block 110 of FIG. 1. Accordingly, dynamically assigned factors for allocating bandwidth may be implemented.

Figure 5:
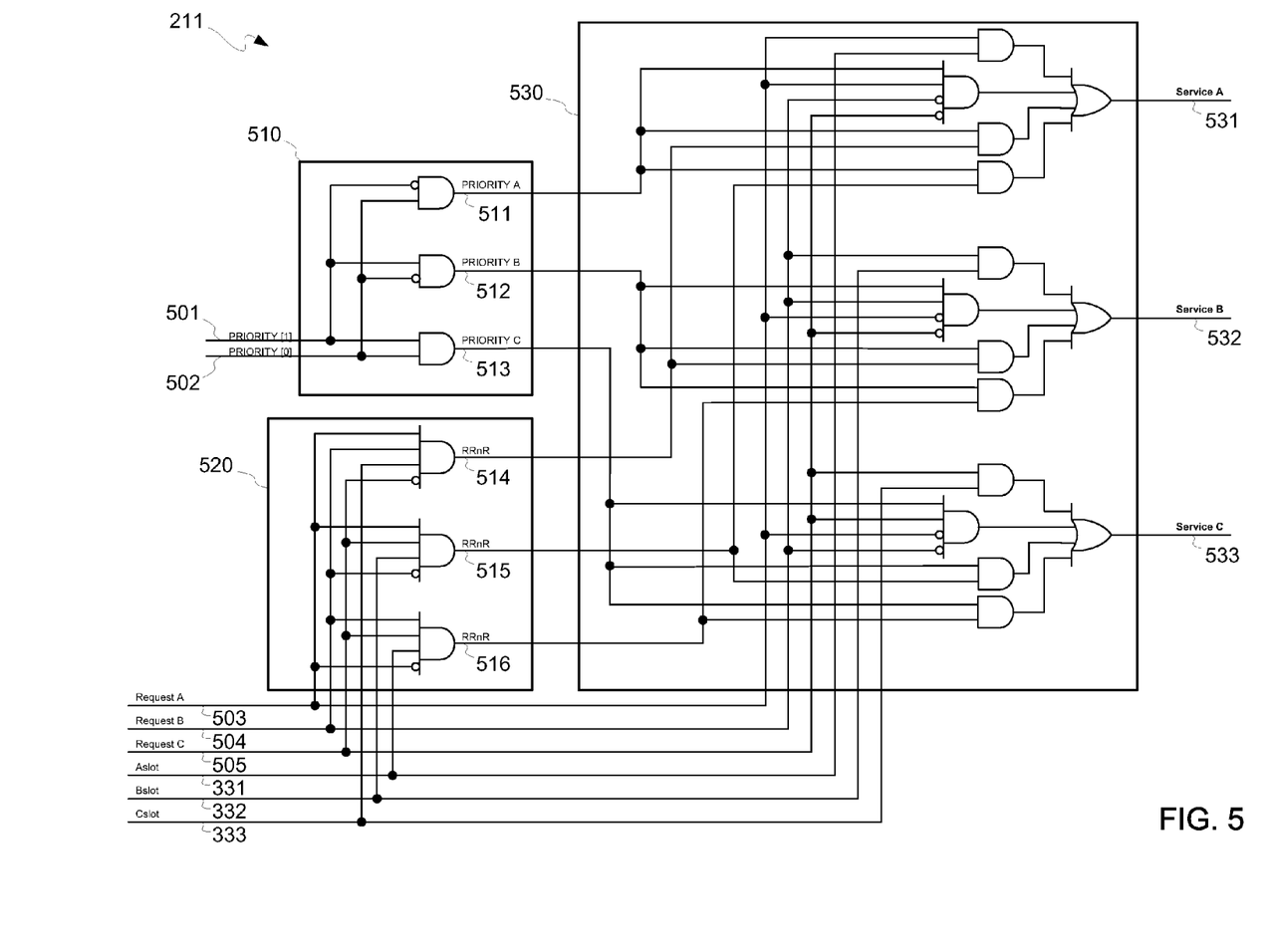
FIG. 5 is a circuit diagram depicting an exemplary embodiment of a priority arbiter 211 of the FPGA system of FIG. 2.

FIG. 5 is a circuit diagram depicting an exemplary embodiment of priority arbiter 211 of FIG. 2. Priority arbiter 211 includes priority decoder 510, service decoder 530, and request, request, not request ("RRnR") decoder 520. Decoders 510, 520, and 530 may be implemented with combinational logic as illustratively shown. For example, priority signals 501 and 502 may be input to priority decoder 510. A code may be predetermined for decoding priority signals 501 and 502. For example, 00, 01, 10, and 11 for priority signals 501 and 502 in combination may respectively indicate that no port has priority, port A has priority, port B has priority, and port C has priority. Using this decoding, it may be determined which of priority A signal 511, priority B signal 512, and priority C signal 513 sourced from decoder 510, if any, is active.

Request A signal 503, request B signal 504, and request C signal 505 may respectively be provided from master devices 201 through 203. Thus, one or more of master devices 201 through 203 of FIG. 2 may have an active request and may indicate such by asserting a respective request signal. Request signals 503 through 505 and slot signals 331 through 333 are input to RRnR decoder 520, and responsive thereto RRnR decoder 520 produces RRnR signals 514 through 516. RRnR signal 514 may be used to indicate that both request signals 503 and 504 are active, and that request C signal 505 is not active though C slot signal 333 associated with request C signal 505 is currently active. Likewise, RRnR signal 515 may be used to indicate that request A signal 503 and request C signal 505 are active, and that request B signal 504 is not active though B slot signal 332 associated with request B signal 504 is currently active. Lastly, RRnR signal 516 may be used to indicate that request B signal 504 and request C signal 505 are active, and that request A signal 503 is not active though A slot signal 331 associated with request A signal 503 is currently active.

Only one of slot signals 331 through 333 is active at a time. Slot signals 331 through 333 respectively correspond to request signals 503 through 505, and request signals 503 through 505 respectively correspond to master devices 201 through 203. Because only one slot signal is active at time, if a requesting master device is not active when a time slot for such device is active, to enhance channel utilization, an RRnR signal of RRnR signals 514 through 516 may be asserted to allow an active requesting master device channel access. Furthermore, if more than one request is active at a time, priority signals 511 through 513 may be used to select as between currently active requests.

Decoder 530 is coupled to receive request signals 503 through 505, slot signals 331 through 333, priority signals 511 through 513, and RRnR signals 514 through 516 for providing service A signal 531, service B signal 532, and service C signal 533. Only one of service signals 531 through 533 is active at a time.

Accordingly, it should be appreciated that service signals 531 through 533, as well as slot signals 331 through 333, are weighted TDMA signals, which are weighted using DSMs. The weighted values for the above example had precision down to $\frac{1}{128}^{th}$ of the total allocable bandwidth. However, greater precision may be provided by using DSMs capable of larger A-factor and B-factor inputs, such as greater than 7 bits for example. However, it should be appreciated that A-factor and B-factor may be respectively apportioned with any percentages as set by a user or as dynamically determined.

Figure 6:
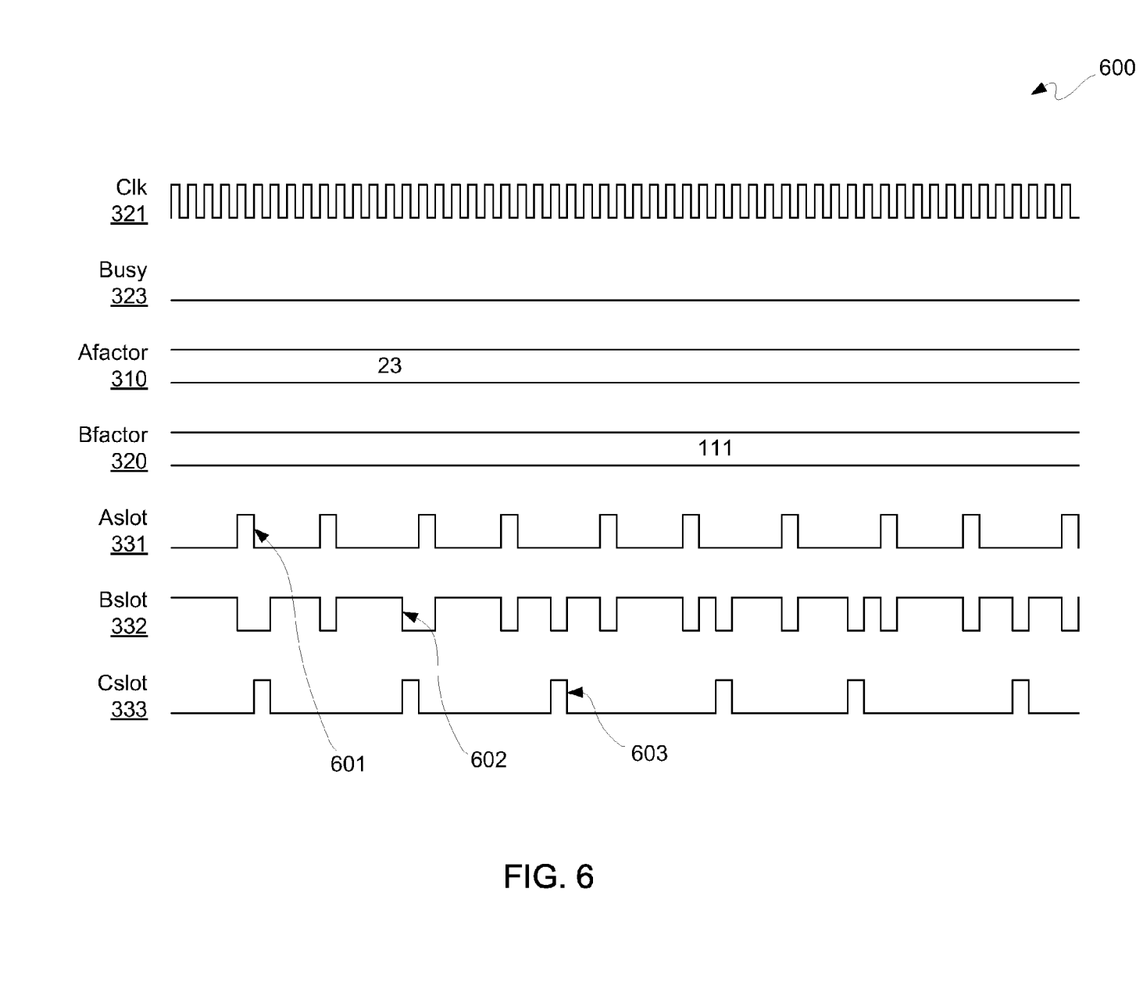
FIG. 6 is a timing diagram depicting an exemplary embodiment of slot distribution for the TDMA arbiter of FIG. 3.

In addition to the ability to have high precision weighting factors, whether statically or dynamically assigned, it should be appreciated that slot assignments are interleaved responsive to the weighted assignments. Along those lines, FIG. 6 is a timing diagram depicting an exemplary embodiment of slot distribution 600 for TDMA arbiter 210 of FIG. 3. It should be appreciated that although specific numerical examples are provided for purposes of clarity by way of example and not limitation, numerical values other than those used herein may be employed. Slot signals 331 through 333 are generated using clock signal 321, as should be appreciated from FIG. 6. In this example, busy signal 323 is not asserted, and A-factor 310 has a value of 23 and B-factor 320 has a value of 111. Thus, port A is assigned $23/128$ or 17.97% of the bandwidth, and port B is assigned $(111/128)\times((128-23)/128)$ or 71.14% of the bandwidth. The remainder bandwidth of 10.89% is assigned to port C. Thus, A slot signal 331 has a 17.97% average duty cycle, namely is active approximately 17.97% of the time, B slot signal 332 has a 71.14% average duty cycle, and C slot signal 333 has a 10.89% average duty cycle.

If pulses 601 of A slot signal 331 are active high, pulses 602 of B slot signal 332 and pulses 603 of C slot signal 333 are inactive low. Likewise, if pulses 602 are active high, neither pulses 601 nor pulses 603 are active high. Lastly, if pulses 603 are active high, neither pulses 601 nor pulses 602 are active high. Thus, it should be appreciated that slot assignments are interleaved based on assigned weights from DSM modulation.

Figure 7:
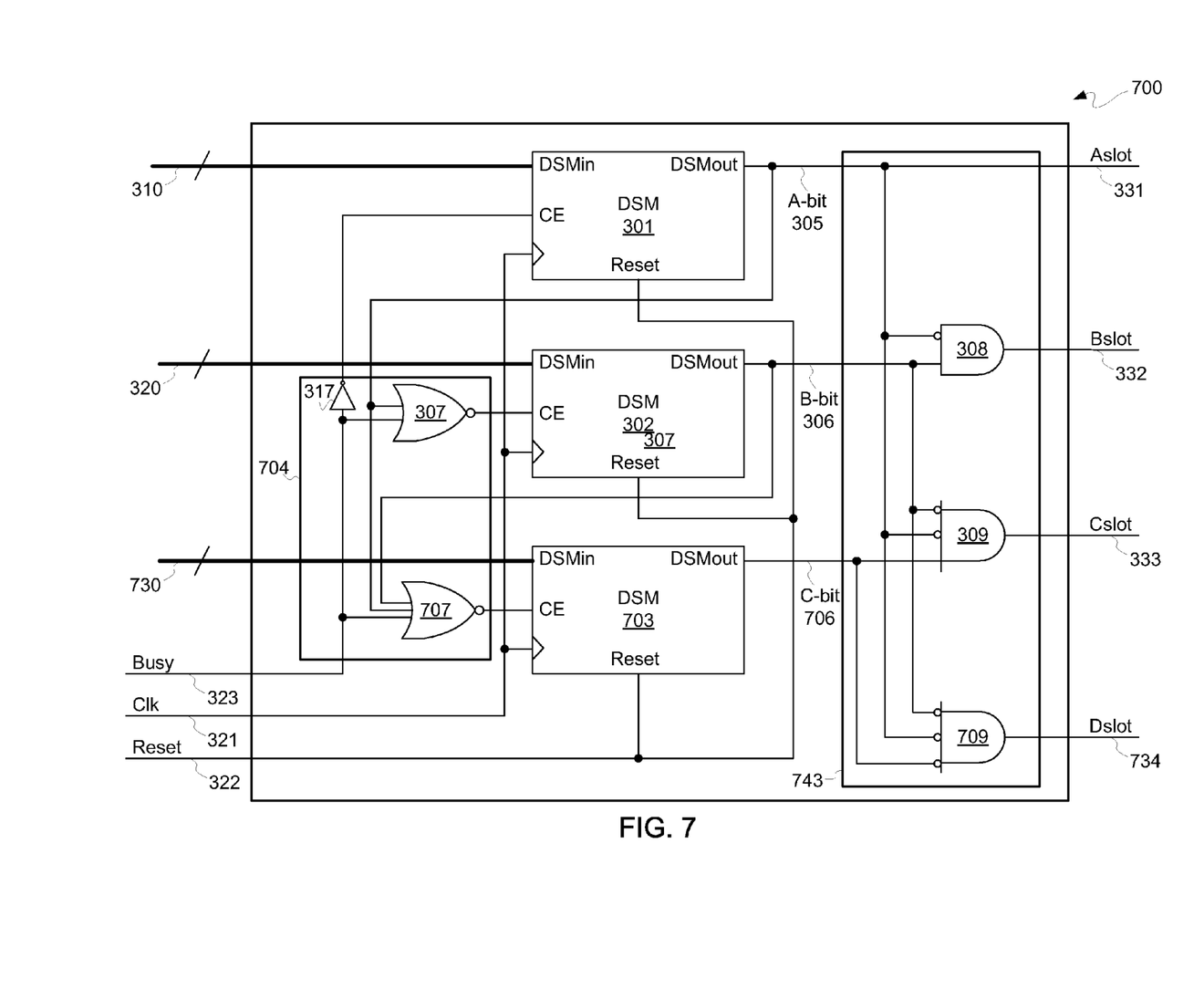
FIG. 7 is a block/circuit diagram depicting an exemplary embodiment of a four slot assignment TDMA arbiter.

FIG. 7 is a block/circuit diagram depicting an exemplary embodiment of a TDMA arbiter 700. TDMA arbiter 700 is a four-port arbiter. TDMA arbiter 700 is similar to TDMA arbiter 210 of FIG. 3, and thus repeated description is avoided for purposes of clarity.

In TDMA arbiter 700, C factor 730 is input to DSM 703 at a DSM input port thereof. DSM 703 is just like DSMs 301 and 302. Busy signal 323 is provided to busy control logic 704. Busy control logic 704 is busy control logic 304 of FIG. 3 with an added NOR gate 707. Input to NOR gate 707 includes busy signal 323, A-bit signal 305, and B-bit signal 306. A clock enable port of DSM 703 is sourced from the output of NOR gate 707. Clock signal 321 is provided to a clock port of DSM 703, and reset signal 322 is provided to a reset port of DSM 703. Output from DSM 703 is C-bit signal ("C-bit") 706.

C-bit 706 is provided to slot select circuit 743. Slot select circuit 743 is slot select circuit 303 with an additional AND gate 709 having all of its inputs inverted. Inputs to AND gate 709 are bit signals 305, 306, and 706. Additionally, AND gate 309 of FIG. 7 is different than AND gate 309 of FIG. 3 in that another input port which is not inverted receives C-bit 706. Slot select circuit 743 provides slot signals 331 through 333, as well as D slot signal 734. D slot signal 734 is sourced from the output of AND gate 709.

Thus, scaling a TDMA arbiter to the number of ports follows from the description herein. Accordingly, it should be appreciated that as described herein a TDMA arbiter may be scaled up or down to accommodate any of a variety of multi-ported architectures sharing access to a channel.

Figure 8:
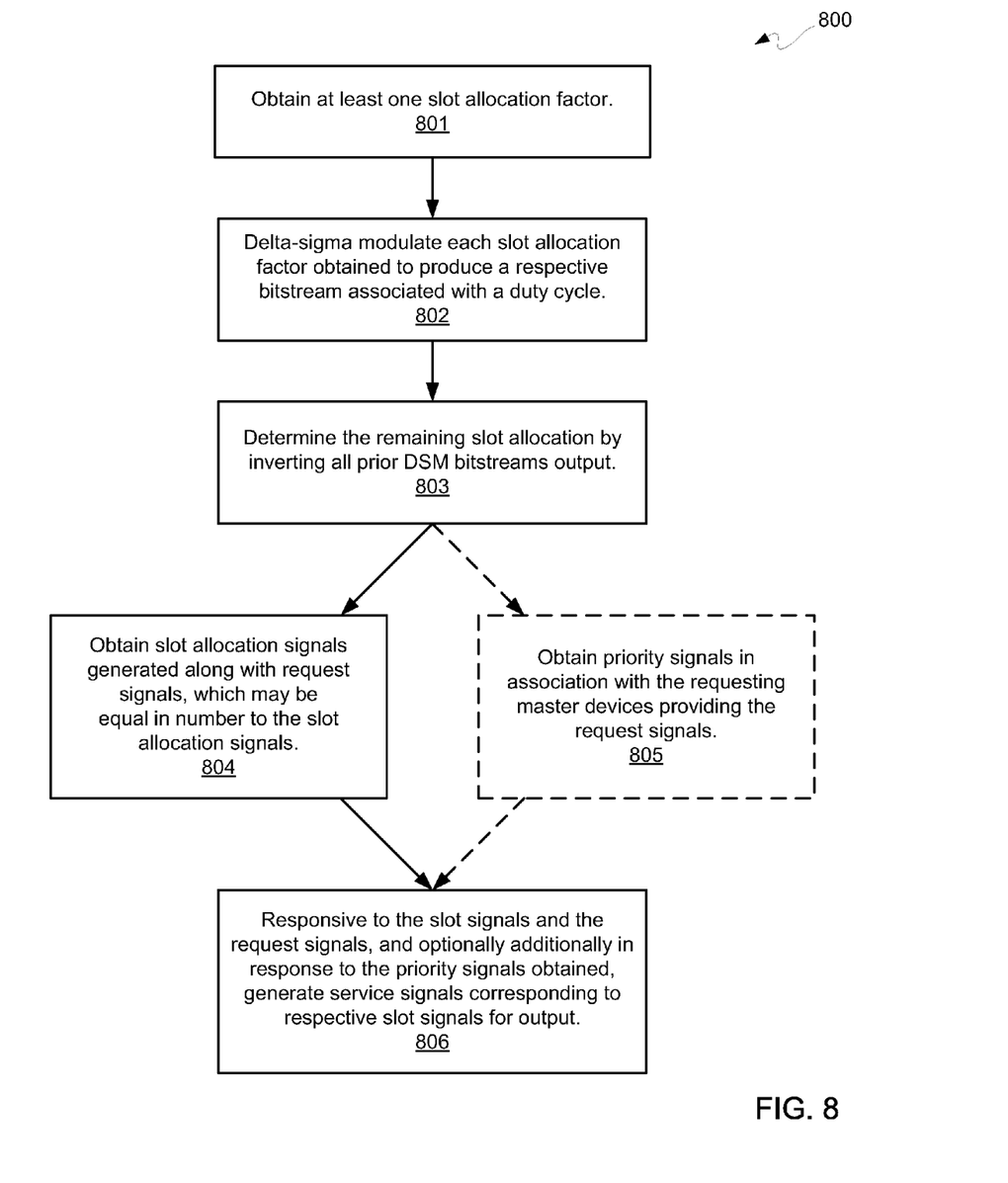
FIG. 8 is a flow diagram depicting an exemplary embodiment of an arbitration flow.

FIG. 8 is a flow diagram depicting an exemplary embodiment of an arbitration flow 800. At 801, at least one slot allocation factor is obtained. At 802, the at least one slot allocation factor obtained is delta-sigma modulated to produce a string of bits ("bitstream") associated with a duty cycle. The duty cycle is in relation to the at least one slot factor obtained. The string of bits provides a slot allocation signal. By inverting the slot allocation signal obtained at 802, another slot allocation signal indicating a remainder of available bandwidth is obtained at 803.

For more than one slot allocation factor obtained at 801, at 802 each of such slot allocation factors is respectively delta-sigma modulated by the progressive decrease in available bandwidth due to prior DSM modulations to produce respective associated bitstreams therefrom. Such delta-sigma modulation for a highest order is for all available allocable bandwidth prior to any decrease thereof. However, delta-sigma modulation for each lower order thereafter is done with progressive adjustment by progressively reducing the available bandwidth according to all prior slot allocations resulting from all prior delta-sigma modulations. Thus, even though the delta-sigma modulation is performed the same in each delta-sigma modulation stage, effectively a bandwidth reduction factor is applied thereto to account for all prior allocated bandwidth of higher order delta-sigma modulations. This progressive reduction is provided by feeding back higher order DSM outputs to lower order DSMs under control of gating logic to control operation of such lower order DSMs.

Thus at 802, there is only one active bitstream provided delta-sigma modulations. Furthermore, other than the highest order delta-sigma modulation, each such bitstream is deactivated responsive to any higher order delta-sigma modulation being active. Thus, the duty cycle of a slot allocation associated with a delta-sigma modulation is responsive to its slot factor reduced by a reduction factor. The reduction factor may take into account all higher order delta-sigma modulation by such activation and deactivation of a DSM, as previously described. At 803, the remaining slot allocation may be determined by inverting all prior bitstreams obtained at 802 and by combinatorial ANDing of all such inverted prior bitstreams.

At 804, slot allocation signals generated at 802 and 803 are obtained along with request signals. The request signals may be equal in number to the slot allocation signals.

Optionally at 805, priority signals in association with the requesting master devices providing the request signals of 804 may be obtained. At 806, responsive to the slot signals and the request signals, and optionally additionally in response to the priority signals obtained at 805, service signals respectively corresponding to the slot signals may be generated for output.

It should be appreciated that operations 801 through 803 are for a first stage TDMA arbitration where delta-sigma modulation is used to weight the slot allocations generated. Furthermore, it should be appreciated that operations 804 through 806 are for an optional second stage arbitration that may be used to increase channel utilization. In such optional second stage arbitration, either or both priority signals or request signals may be used.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, even though the above description has been in terms of access to shared memory, it should be appreciated that the above description may be implemented in any communication system where multiple resources have TDMA to a shared channel. Claim(s) listing steps do not imply any order of the steps. Trademarks are the property of their respective owners.

What is claimed is:

1. A method for arbitrating access to a shared resource among multiple devices, comprising:
   obtaining a first arbitration factor;
   first delta-sigma modulating the first arbitration factor using a first delta-sigma modulator to produce a first slot signal, wherein the first arbitration factor has X number of bits to provide for a bandwidth allocation granularity of $1/2^x$ resolution;
   obtaining a second arbitration factor;
   second delta-sigma modulating the second arbitration factor using a second delta-sigma modulator to produce a second slot signal, wherein the first slot signal is fed back to the second delta-sigma modulator for controlling clock activation of the second delta-sigma modulator for second delta-sigma modulating the second arbitration factor; and
   the first slot signal and the second slot signal being for Time Division Multiple Access-arbitrated access to the shared resource.

2. The method according to claim 1, wherein:
   the first slot signal is for a first percentage of allocable channel bandwidth;
   the second slot signal is for a second percentage of the allocable channel bandwidth; and
   the second percentage of the allocable channel bandwidth is of a first remainder of the allocable channel bandwidth after reduction by bandwidth allocation responsive to the first slot signal.

3. The method according to claim 1, further comprising producing a third slot signal using the first slot signal and the second slot signal in combination.

4. The method according to claim 3, wherein the first slot signal, the second slot signal, and the third slot signal are interleaved with respect to one another.

5. The method according to claim 3, wherein:
   the first slot signal is for a first percentage of allocable channel bandwidth;
   the second slot signal is for a second percentage of the allocable channel bandwidth;
   the second percentage of the allocable channel bandwidth is of a first remainder of the allocable channel bandwidth after reduction by bandwidth allocation responsive to the first slot signal; and
   the third slot signal is a second remainder of the allocable channel bandwidth after bandwidth allocation responsive to the first slot signal and the second slot signal.

6. The method according to claim 1, further comprising:
obtaining request signals from a first master device and a second master device;
the first master device associated with the first slot signal;
the second master device associated with the second slot signal;
first decoding using at least in part the request signals, the first slot signal, and the second slot signal to generate first decoded signals;
the first decoded signals indicating when a master device of the first master device and the second master device has an active slot signal of the first slot signal and the second slot signal but does not have an active transaction request of the request signals; and
generating service signals responsive at least in part to the first decoded signals, the request signals, the first slot signal, and the second slot signal.

7. The method according to claim 6, further comprising:
producing a third slot signal using the first slot signal and the second slot signal in combination;
the first slot signal being for a first percentage of allocable channel bandwidth;
the second slot signal being for a second percentage of the allocable channel bandwidth;
the second percentage of the allocable channel bandwidth being of a first remainder of the allocable channel bandwidth after reduction by bandwidth allocation responsive to the first slot signal; and
the third slot signal being a second remainder of the allocable channel bandwidth after bandwidth allocation responsive to the first slot signal and the second slot signal.

8. The method according to claim 7, further comprising:
obtaining request signals from the first master device, the second master device, and a third master device;
the third master device associated with the third slot signal;
only one of the first slot signal, the second slot signal, and the third slot signal being active at a time;
the first decoding using the request signals, the first slot signal, the second slot signal, and the third slot signal to generate the first decoded signals;
the first decoded signals indicating when one of the first master device, the second master device, and the third master device has the active slot signal of the first slot signal, the second slot signal, and the third slot signal but does not have the active transaction request of the request signals;
obtaining priority signals associated with assigned priority to the first master device, the second master device, and the third master device;
second decoding using the priority signals, the request signals, the first slot signal, the second slot signal, and the third slot signal to generate second decoded signals; and
generating the service signals responsive to the first decoded signals, the second decoded signals, the request signals, the first slot signal, the second slot signal, and the third slot signal.

9. The method according to claim 1, wherein the first slot signal and the second slot signal have a same granularity for incrementally apportioning the allocable channel bandwidth in $1/128$th or smaller increments.

10. An arbiter, comprising:
a first delta-sigma modulator for receiving a first modulation factor and configured to produce a first slot allocation responsive to the first modulation factor, wherein the first modulation factor has X number of bits to provide for a bandwidth allocation granularity of $1/2^X$ resolution; and
a second delta-sigma modulator for receiving a second modulation factor and configured to produce a second slot allocation responsive to the second modulation factor and the first slot allocation;
wherein the first slot allocation is fed back to the second delta-sigma modulator for controlling clock activation of the second delta-sigma modulator for producing the second slot allocation.

11. The arbiter according to claim 10, wherein:
the first delta-sigma modulator is of a higher order than the second delta-sigma modulator;
the first slot allocation having a first duty cycle directly associated with the first modulation factor; and
the second slot allocation having a second duty cycle that is a product of the second modulation factor and a fraction of allocable bandwidth remaining after the first slot allocation.

12. The arbiter according to claim 11, further comprising:
slot selection logic coupled to receive the first slot allocation and the second slot allocation; and
the slot selection logic configured to produce a third slot allocation responsive to both the first slot allocation and the second slot allocation being inactive.

13. The arbiter according to claim 12, wherein the slot selection logic is further configured to ensure that only one of the first slot allocation, the second slot allocation, and the third slot allocation are active at a time.

14. The arbiter according to claim 11, further comprising:
control logic for receiving the first slot allocation; and
the control logic coupled to receive the first slot allocation and configure to provide an activation signal to the second delta-sigma modulator representative of the fraction of allocable bandwidth remaining after the first slot allocation.

15. The arbiter according to claim 14, wherein:
the control logic is further for receiving a busy signal from a shared device for which the arbiter provides access arbitration; and
the control logic is configured to maintain the arbiter in a current slot allocation state responsive to assertion of the busy signal.

16. The arbiter according to claim 15, wherein the shared device is a memory controller.

17. The arbiter according to claim 16, wherein the arbiter is part of the memory controller.

18. The arbiter according to claim 15, further comprising:
a request/priority arbitration block;
the request/priority arbitration block for receiving request signals from master devices and for receiving priority signals for prioritizing the master devices;
the request/priority arbitration block coupled to receive the first slot allocation, the second slot allocation, and the third slot allocation;
the request/priority arbitration block configured to:
first decode the priority signals to provide first decoded signals;
second decode a combination of the first slot allocation, the second slot allocation, the third slot allocation, and the request signals to provide second decoded signals; and
third decode a combination of the first slot allocation, the second slot allocation, the third slot allocation, the request signals, the first decoded signals, and the second decoded signals to provide service signals corresponding to the first slot allocation, the second slot allocation, and the third slot allocation.

* * * * *